United States Patent Office 3,153,411
Patented Oct. 20, 1964

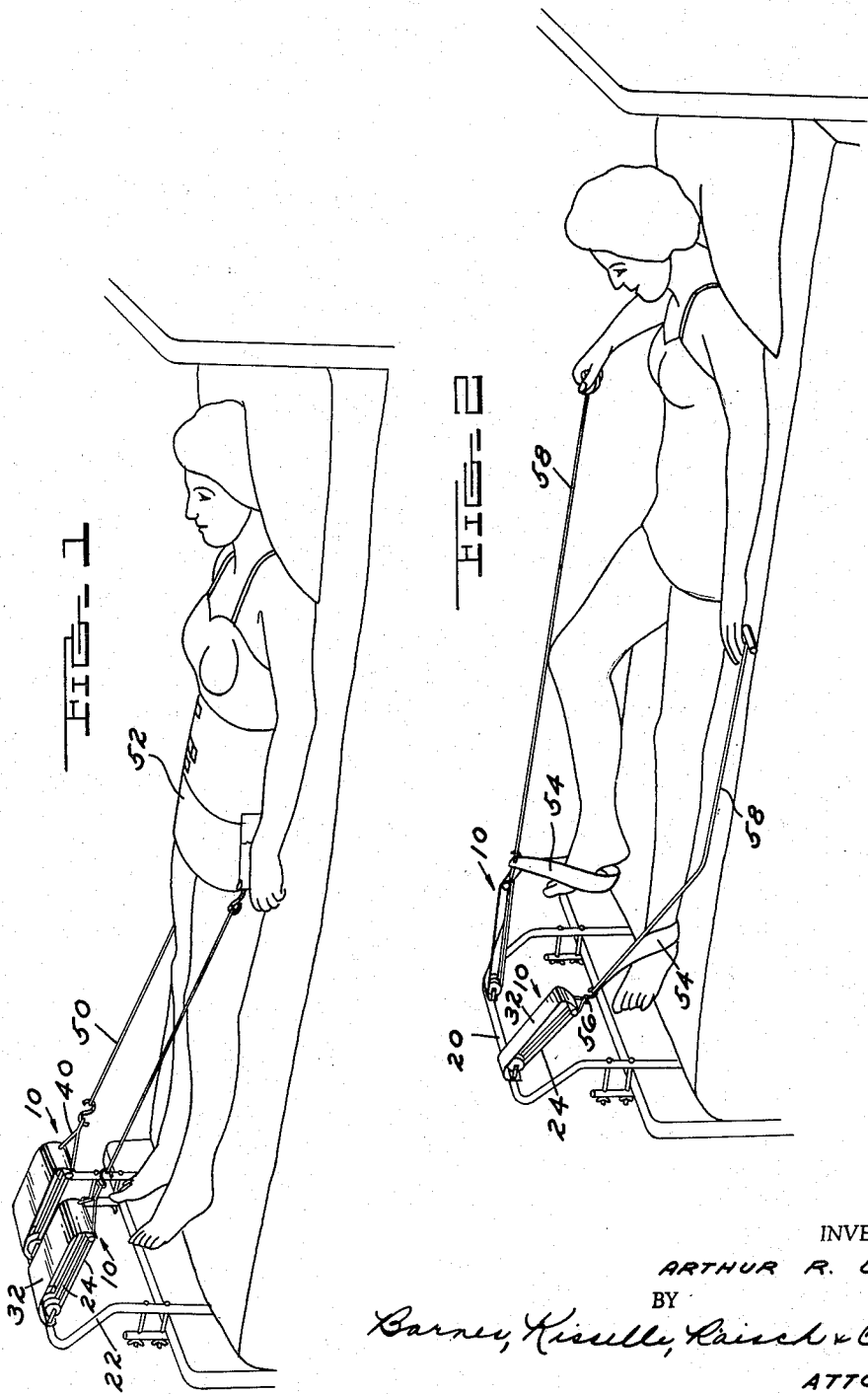

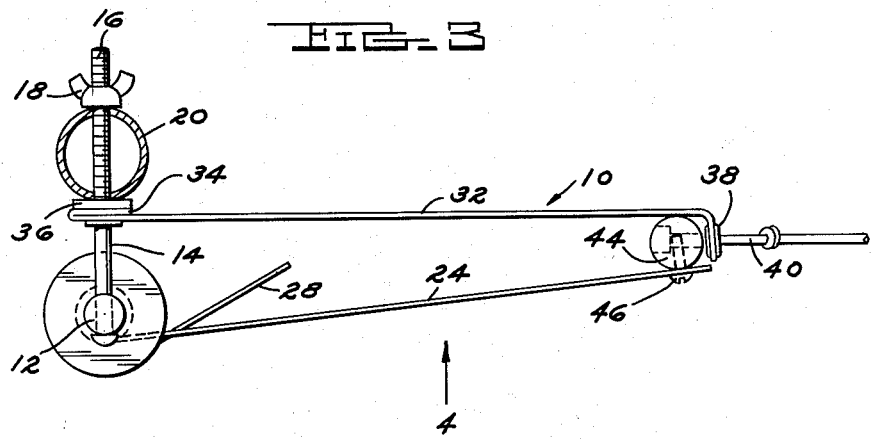
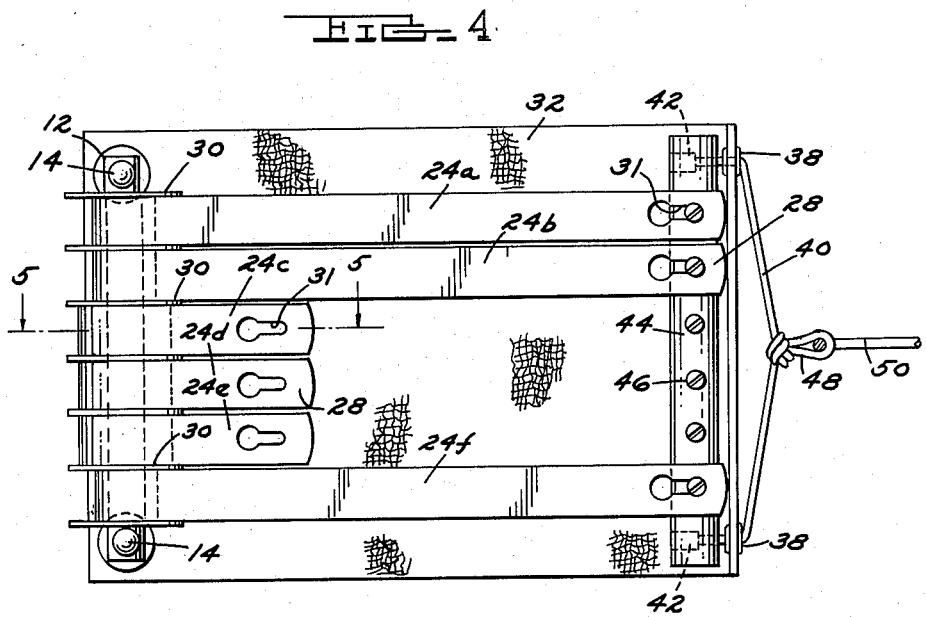
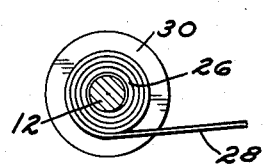
INVENTOR.
ARTHUR R. UNKS
BY
Barney, Kiselle, Raisch & Choate
ATTORNEYS

3,153,411
TRACTION DEVICE
Arthur R. Unks, P.O. Box 21, Farmington, Mich.
Filed Nov. 30, 1961, Ser. No. 158,931
16 Claims. (Cl. 128—75)

This invention relates to a traction device of the type conventionally used in orthopedic procedures for applying tension to certain portions of the human torso.

It is an object of this invention to provide a traction device which enables an accurately predetermined amount of tension to be applied to the desired portion of the patient's body.

A further object of the invention resides in the provision of a traction device of the type described which is designed such that the amount of tension applied to the patient's body can be increased or decreased in accurate increments with a minimum of difficulty.

A further object of the invention resides in the provision of a traction device employing constant tension springs as the tension producing means.

Other objects and advantages of the invention will become apparent from the following description and drawings in which:

FIG. 1 is a fragmentary perspective view illustrating the traction device of this invention utilized for applying tension to the hip-pelvic region of a patient's body.

FIG. 2 is a view similar to FIG. 1 illustrating the manner in which the traction device of the present invention can be utilized for applying tension to the legs and back of a patient.

FIG. 3 is a fragmentary side elevational view, partly in section, of the traction device of the present invention.

FIG. 4 is a plan view of the traction device as viewed in the direction of the arrow 4 in FIG. 3.

FIG. 5 is a sectional view of one of the constant tension springs employed in the traction device as viewed along the line 5—5 in FIG. 4.

In the drawings, the traction device of the present invention is generally indicated at 10 and includes a spindle 12 through the opposite ends of which extend posts 14, the free end portions 16 of which are threaded to receive wing nuts 18. The posts 14 are adapted to extend through a cross bar 20 of a U-shaped support bracket 22 adapted to be mounted on a bedstead as shown in FIGS. 1 and 2. The mounting of the traction device as shown in FIGS. 1 and 2 is for illustrative purposes only. As the description proceeds, it will become apparent that the traction device is designed to be mounted on any suitable support depending on the manner in which the traction device is used. For example, in FIGS. 1 and 2, the traction device is shown mounted at the foot of a bed for applying tension to the hip-pelvic region or to the legs and back of a patient. If the traction device of the present invention is used for applying tension to the neck of a patient, for example, the patient might be disposed in a sitting position and the traction device would be mounted on an overhead support of suitable construction.

Referring more particularly to FIGS. 3, 4 and 5, the traction device of this invention includes a plurality of constant tension springs 24a, b, c, d, e, f, loosely journalled on spindle 12. Springs 24 are of the conventional constant tension type, each comprising a plurality of overlapping spiral convolutions 26 terminating in a flat outer free end 28. Each spring 24 is adapted to be unwound by the application of a uniform constant tension to the free end 28 of the springs. In the embodiment illustrated in FIG. 4, six springs 24 are shown loosely journalled on spindle 12. The springs are separated from one another by means of washers 30 which prevent the convolutions of adjacent springs from coming in contact with one another. The free end 28 of each spring is provided with a keyhole-shaped slot 31.

A canvas strip 32 has one end 34 thereof clamped against a strap 36 which spans and is mounted on the posts 14. The opposite end of canvas strip 32 has a pair of grommeted openings 38, one adjacent each side edge of the strip. A yoke cord 40 has its opposite ends extending through the grommeted openings 38 and secured as at 42 to the opposite ends of a wooden dowel 44. Dowel 44 has a plurality of screws 46 driven therein with the heads of the screws spaced slightly from the cylindrical surface of dowel 44. Screws 46 are aligned axially along dowel 44 and are spaced apart to correspond with the spacing of the keyhole slots 31 on the adjacent springs 24. The enlarged circular portions of the keyhole slots 31 accommodate the heads of screws 46 while the narrower elongated portions of the keyhole slots 31 accommodate the shanks of screws 46. Yoke cord 40 is fashioned with a center loop 48 to which a tension cord 50 is connected. Tension cord 50 at its free end is adapted to be connected to a hip harness 52 (FIG. 1), a foot stirrup 54 (FIG. 2) or any other suitable band or strap adapted to encircle or otherwise attach to a portion of the patient's body to which the traction is to be applied. The canvass strip 32 has several important functions. The length of strip 32 is less than the length of any of the springs 24 so that strip 32 limits the extent to which the springs 24 can be extended and thereby prevents the springs from being completely unwound from spindle 12. Strip 32 also provides a protective covering over springs 24 such that bed covers and the like are prevented from becoming entangled in the extended springs 24.

Springs 24, if desired, may all have equal tension values. In the arrangement shown in FIG. 4, for example, each spring may have a tension value of four pounds, for example. On the other hand, the springs 24 may have tension values which differ from one another by way of predetermined increments. In either case, the device is designed such that any number of the springs 24 on spindle 12 may be interengaged with dowel 44 so that the tension applied to cord 50 through the dowel 44 can be adjusted by accurately predetermined increments. Assuming, for the sake of illustration, that in the arrangement shown in FIG. 4, each spring 24 has a tension value of four pounds, since springs 24a, 24b and 24f are interconnected with dowel 44, the springs, when extended any degree, would apply a tension to cord 50 of twelve pounds. If all the springs 24 were connected to the dowel 44 by engaging the keyhole slots 31 with the screws 46, then the tension on cord 50 would be twenty-four pounds. Thus, for the arrangement shown in FIG. 4 and assuming that each spring has a tension value of four pounds, the tension applied to cord 50 could be varied in four-pound increments from a low value of four pounds to a maximum value of twenty-four pounds.

As explained previously, the traction device of this invention is illustrated in FIG. 2 in the manner used for applying traction to the legs and back of a patient. In this arrangement, two traction devices 10 are mounted on the cross bar 20, one for each leg of the patient. To each yoke cord 40, there is connected a foot stirrup 54 as by a hook 56. In this arrangement, there is also connected to the two hooks 56 pull cords 58. These cords 58 are of a sufficient length so as to extend alongside the patient to a position where the patient can grasp and exert a pulling force on the pull cords 58. This enables the patient to insert or remove his feet from the stirrrups 54 without the assistance of others. Thus, the traction device of the present invention is not limited to hospital used but is also designed for home use where the patient can manipulate it by himself.

I claim:
1. A device for applying traction to selected portions of the human torso comprising a spindle, means connected to the spindle for mounting the spindle on a support, a constant tension extendable spring of the coiled type journalled on said spindle, said spring having a free outer end, a flexible element having a length less than the length of said spring, said flexible element having one end fixed to the spindle mounting means and the opposite end connected to the free end of the spring to thereby limit the maximum extension of the spring and a flexible tension member having one end connected to the last mentioned end of the flexible element and adapted to be connected at its opposite end to the portion of the patient's body to which it is desired to apply traction.

2. A device for applying traction to selected portions of the human torso comprising a spindle, means connected to the spindle for mounting the spindle on a support, a constant tension extendable spring of the coiled type journalled on said spindle, said spring having a free outer end, a flexible element having a length less than the length of said spring, said flexible element having one end fixed to the spindle mounting means, a rigid member connected to the opposite end of said flexible element, means interconnecting said rigid member with the free end of the spring, and a flexible tension member connected to said rigid member and adapted to be connected to the portion of the patient's body to which it is desired to apply traction.

3. The combination set forth in claim 2 including a pull cord connected to said rigid member and being of sufficient length to be grasped by the patient for extending said spring.

4. A device for applying traction to selected portions of the human torso comprising a spindle, means connected to the spindle for mounting the spindle on a support, a plurality of constant tension extendable springs of the coiled type journalled on said spindle, said springs each having a free outer end, said free outer ends having attachment means thereon and a flexible tension member having a plurality of attachment means at one end selectively engaged with any number of the free ends of said springs and adapted to be connected at its other end to the portion of the patient's body to which it is desired to apply traction.

5. A device for applying traction to selected portions of the human torso comprising a spindle, means connected to the spindle for mounting the spindle on a support, a plurality of constant tension extendable springs of the coiled type journalled on said spindle, said springs each having a free outer end, a tension member connected at one end to the extended free ends of the springs and adapted to be connected at its other end to a portion of a patient's body, means for limiting the maximum extension of said springs comprising a flexible element having a length shorter than the length of each spring, said flexible element having one end fixed to said spindle mounting means and means at the other end of said flexible element engaged with the free ends of said springs.

6. The combination set forth in claim 5 wherein said last-mentioned means comprises a plurality of individual attachment members selectively connected with any number of the free ends of said springs.

7. The combination set forth in claim 6 wherein said springs have equal tension values.

8. The combination set forth in claim 6 wherein the tension values of said springs differ.

9. The combination set forth in claim 6 including a rigid member secured to said other end of the flexible element, said attachment members being spaced along said rigid member and corresponding in number with the number of said springs on said spindle.

10. The combination set forth in claim 6 wherein said flexible element comprises a strip of non-stretchable sheet material.

11. The combination set forth in claim 10 wherein said strip of sheet material has a width corresponding to at least the axial span of said springs on said spindle.

12. The combination set forth in claim 11 including a rigid member extending transversely across said other end of said strip of sheet material and secured thereto, said attachment members being secured to said rigid member.

13. The combination set forth in claim 12 wherein said attachment members are spaced along said rigid member to corresponding with the axial spacing of said springs on said spindle.

14. The combination set forth in claim 13 wherein the free ends of said springs are apertured and said attachment members comprise a plurality of fastening elements hooked into the apertures at the free ends of said springs.

15. A traction device for applying traction to selected portions of the human torso comprising a spindle, means connected to the spindle for mounting the spindle on a support, a plurality of constant tension extendable springs of the coiled type journalled on said spindle in axially adjacent relation, means for limiting the maximum extension of said springs comprising a flexible element having a length shorter than the length of said springs, said flexible element having one end fixed to said spindle mounting means and having a rigid member secured to the other end thereof, a plurality of attachment means on said rigid member selectively connectable with any number of the free ends of said springs, a tension cord having one end connected to said rigid member, the other end of said tension member haivng a sling member connected thereto for encircling a portion of the patient's body to which it is desired to apply traction.

16. The combination set forth in claim 15 including a full cord also connected with said rigid member, said pull cord being of a length sufficient to enable the patient to grasp it to thereby manually extend said springs.

References Cited in the file of this patent
UNITED STATES PATENTS

| | | |
|---|---|---|
| 122,288 | Smith | Dec. 26, 1871 |
| 198,179 | Anderson | Dec. 18, 1877 |
| 2,609,193 | Foster | Sept. 2, 1952 |